United States Patent
Tang et al.

(10) Patent No.: US 9,638,959 B2
(45) Date of Patent: May 2, 2017

(54) LIQUID CRYSTAL DISPLAY PANEL AND LIQUID CRYSTAL DISPLAY DEVICE

(71) Applicant: BOE Technology Group Co., Ltd., Beijing (CN)

(72) Inventors: Guangtao Tang, Beijing (CN); Jaegeon You, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 120 days.

(21) Appl. No.: 13/945,308

(22) Filed: Jul. 18, 2013

(65) Prior Publication Data

US 2014/0043572 A1    Feb. 13, 2014

(30) Foreign Application Priority Data

Aug. 10, 2012  (CN) .......................... 2012 1 0285372

(51) Int. Cl.
*G02F 1/1337*  (2006.01)
*G02F 1/137*  (2006.01)
*G02F 1/1333*  (2006.01)
*G02F 1/1341*  (2006.01)

(52) U.S. Cl.
CPC ........ *G02F 1/1337* (2013.01); *G02F 1/13378* (2013.01); *G02F 1/13718* (2013.01); *G02F 2001/13415* (2013.01); *G02F 2001/133342* (2013.01); *G02F 2001/133776* (2013.01)

(58) Field of Classification Search
CPC ....... G02F 1/1337; G02F 2001/133776; G02F 1/133707; G02F 1/133723; G02F 1/13378; G02F 1/13718; G02F 2001/133342; G02F 2001/13415
See application file for complete search history.

(56) References Cited

U.S. PATENT DOCUMENTS

| | | | |
|---|---|---|---|
| 5,917,570 A | 6/1999 | Bryan-Brown et al. | |
| 2001/0026347 A1* | 10/2001 | Sawasaki et al. | 349/156 |
| 2003/0218586 A1 | 11/2003 | Wu et al. | |
| 2005/0140907 A1 | 6/2005 | Yun | |
| 2007/0109471 A1* | 5/2007 | Ting | G02F 1/1333 349/113 |
| 2007/0132900 A1 | 6/2007 | Lee | |

(Continued)

FOREIGN PATENT DOCUMENTS

| CN | 1637560 A | 7/2005 |
|---|---|---|
| CN | 1983001 A | 6/2007 |
| CN | 101004495 A | 7/2007 |

OTHER PUBLICATIONS

Extended European Search Report for European Patent Application No. 13179830.8 dated Sep. 27, 2013, 9pgs.

(Continued)

*Primary Examiner* — Nathanael R Briggs
(74) *Attorney, Agent, or Firm* — Ladas & Parry LLP

(57) ABSTRACT

The disclosure discloses a liquid crystal display (LCD) panel and an LCD device. The LCD panel comprises a first substrate, a second substrate arranged opposing to the first substrate, and a liquid crystal layer arranged between the first substrate and the second substrate, wherein alignment film layers are provided on the surfaces of the first and second substrates facing the liquid crystal layer, and concave-convex microstructures are formed on the surfaces of the alignment film layers.

11 Claims, 3 Drawing Sheets

(56) References Cited

U.S. PATENT DOCUMENTS

2007/0154657 A1* 7/2007 Sha et al. .................. 428/1.6
2009/0009703 A1* 1/2009 Tamaki et al. ............. 349/123

OTHER PUBLICATIONS

First Office Action issued by the Chinese Patent Office for Chinese Patent Application No. 2012102853724 dated May 6, 2014.
English translation of First Office Action issued by the Chinese Patent Office for Chinese Patent Application No. 2012102853724 dated May 6, 2014.
First Office Action issued by the Chinese Patent Office for Chinese Application No. 201210082332.X, 7pgs.
English translation of First Office Action issued by the Chinese Patent Office for Chinese Application No. 201210082332.X, 7pgs.
Second Office Action (Chinese language) issued by the State Intellectual Property Office ("SIPO") on Dec. 9, 2014 for International Application No. 201210285372.4, 5 pages.
English translation of second Office Action (listed above) issued by SIPO on Dec. 9, 2014 for International Application No. 201210285372.4, 4 pages.
Office Action Rejection Decision (Chinese language) issued by the State Intellectual Property Office ("SIPO") on Apr. 10, 2015 for Application No. 2012102853724, 5 pages.
English translation of Office Action Rejection Decision (listed above) issued by SIPO on Apr. 10, 2015 for Application No. 2012102853724, 6 pages.

* cited by examiner

LIQUID CRYSTAL DISPLAY PANEL AND LIQUID CRYSTAL DISPLAY DEVICE

CROSS REFERENCE TO RELATED APPLICATIONS

This application claims priority from Chinese National Application No. 201210285372.4, filed on Aug. 10, 2012, the contents of which are incorporated herein by reference.

TECHNICAL FIELD

Embodiments of the disclosure relate to a liquid crystal display (LCD) panel and an LCD device.

BACKGROUND

With the continuous development of science and technology, flat panel display (FPD) technologies such as liquid crystal display (LCD), plasma display panel (PDP) and organic light-emitting display (OLED) become increasingly mature, and display devices of a transparent display mode also begin to appear in people's vision. In the transparent display mode, users not only can see images displayed on panels but also can see objects at the rear of the display devices. The transparent display devices can be applied to windshields or household glass so as to provide information required by the users.

It has been noted, in realizing the transparent display mode, that the display mode requires the use of a special liquid crystal, i.e., cholesteric liquid crystal.

Cholesteric liquid crystal is composed of chiral liquid crystal molecules having periodic helical structure in arrangement. The liquid crystal molecules with helical structure have two stable textures: planar (P) texture and focal conical (FC) texture. Liquid crystals in the P texture can reflect the ambient light and hence can be used for forming a bright state while liquid crystals in the FC texture can transmit the ambient light and hence can be used for forming a dark state by light transmission. Therefore, the P texture and the FC texture of the cholesteric liquid crystals can form a pair of contrast states, thereby achieving the function of display.

SUMMARY

In one aspect, the disclosure provides a liquid crystal display (LCD) panel, which comprises a first substrate, a second substrate arranged opposing to the first substrate, and a liquid crystal layer arranged between the first substrate and the second substrate, wherein alignment film layers are provided on the surfaces of the first and second substrates facing the liquid crystal layer; the liquid crystal layer is made of cholesteric liquid crystals; and concave-convex microstructures are formed on the surfaces of the alignment film layers.

In another aspect, the disclosure also provides an LCD device comprising the LCD panel.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

For more clear illustration of the technical proposals of the embodiments of the disclosure, the drawings related to the embodiments will be simply described below. It will be obvious to those skilled in the art that the drawings only involve some embodiments of the disclosure but are not intended to limit the disclosure.

DETAILED DESCRIPTION

Figure 1:
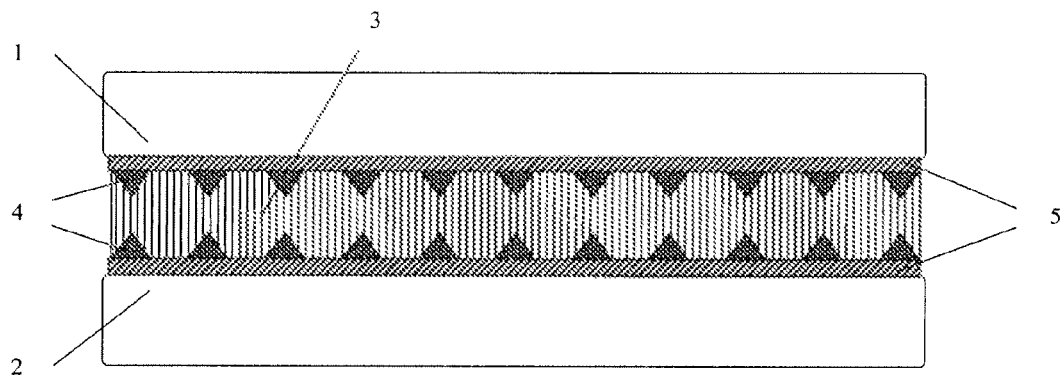
FIG. 1 is a schematic structural view of an LCD panel in an embodiment of the disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the phrase such as "a," "an," etc., is not intended to limit the amount, but indicate the existence of at lease one. The terms such as "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor finds in the development and research of a transparent display device that the traditional transparent display device employing cholesteric liquid crystals at least has the following defects. When the cholesteric liquid crystals are in the P texture, because the liquid crystal molecules are in the helical structure and the overall arrangement manner of the liquid crystal helical axes is parallel to the normal direction of substrates, the Bragg reflection phenomenon may occur when the pitch of the helical structure is close to the wavelength of light, and white light may be reflected as colored light. When the cholesteric liquid crystals are in the FC texture, the overall arrangement mode of the liquid crystal helical axes is substantially parallel to the surfaces of the substrates, but because the cholesteric liquid crystals are also in a multi-domain structure, the directions of the helical axes of various liquid crystal molecules are in chaos state, and as a result partial light may be reflected, incurring partial light leakage in the dark state, and consequently the brightness of the dark state may be increased. Moreover, as the liquid crystal molecules tend to be enlarged by mutual phagolysis, and even liquid crystal domain regions with large size may be formed, and thus the liquid crystals in the liquid crystal layer of a display panel may be unevenly distributed.

An embodiment of the disclosure provides an LCD panel and an LCD device, capable of effectively improving the alignment state of P texture molecules and FC texture molecules of cholesteric liquid crystals, preventing the phenomenon of mutual phagolysis which tends to occur among the liquid crystal molecules, and facilitating the formation of regular multi-domain structures of the cholesteric liquid crystals, thereby optimizing the display performance of the LCD panel and the LCD device and greatly improving the display effect.

In one embodiment, the disclosure provides an LCD panel, which, as illustrated in FIG. 1, comprises a first substrate 1, a second substrate 2 and a liquid crystal layer 3 arranged between the first substrate 1 and the second substrate 2, and the first substrate 1 and the second substrate 2 are arranged opposing to each other; the peripheries of the two substrates may be assembled together with each other, for example, through a sealant (not illustrated) to form a liquid crystal cell; alignment film layers 5 are provided on both the surface of the first substrate 1 and the surface of the second substrate 2, which surfaces face the liquid crystal layer 3; the liquid crystal layer 3 employs cholesteric liquid crystals; and concave-convex microstructures 4 are formed on the alignment film layers 5 and, for example, include island-like protrusions which, for example, are uniformly distributed on the whole substrate surfaces.

Further illustration is given below, with reference to FIGS. 2 and 3, to the molecule alignment states in P texture and FC texture of the cholesteric liquid crystals with respect to the concave-convex microstructures 4.

Figure 2:
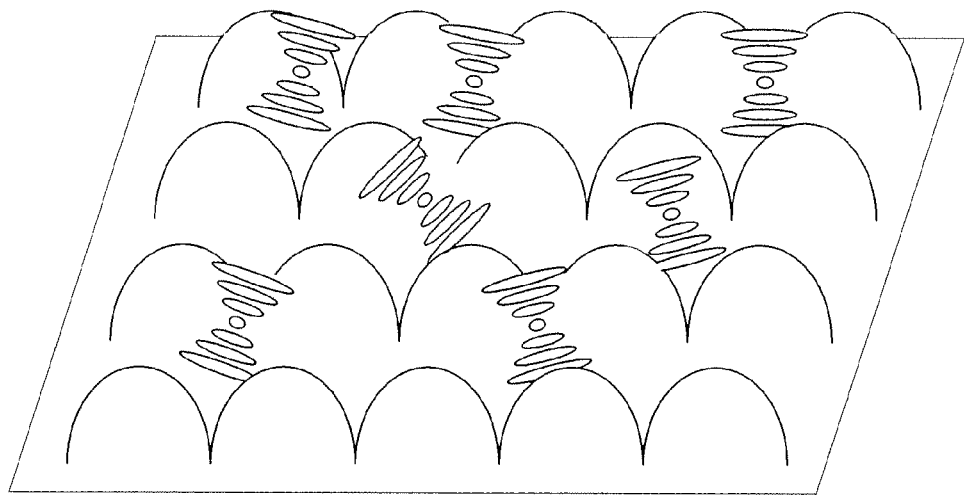
FIG. 2 is a schematic diagram illustrating the alignment state of P texture of cholesteric liquid crystal molecules when alignment film layers in the embodiment of the disclosure have concave-convex microstructures.

As illustrated in FIG. 2, when the cholesteric liquid crystal molecules are in the P texture, under the physical effect (such as Van der Waals force) of non-smooth surfaces of the concave-convex microstructures 4, liquid crystal helical axes generally cannot be arranged parallel to the normal direction of the substrates but are basically arranged irregularly. Due to the irregular arrangement mode of the liquid crystal helical axes, the liquid crystal layer can no longer satisfy the Bragg reflection condition. Therefore, white light in the liquid crystal layer will not be reflected into colored light in the bright state.

Figure 3:
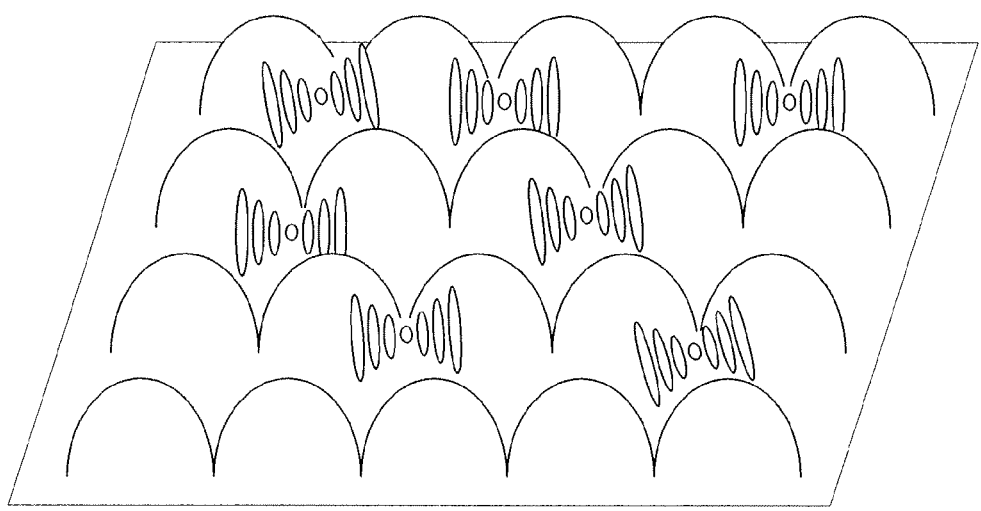
FIG. 3 is a schematic diagram illustrating the alignment state of FC texture of the cholesteric liquid crystal molecules when the alignment film layers in the embodiment of the disclosure have the concave-convex microstructures.

As illustrated in FIG. 3, when the cholesteric liquid crystal molecules are in the FC texture, according to the characteristic of the cholesteric liquid crystals, in general, the overall arrangement mode of the liquid crystal helical axes is substantially parallel to the substrate surfaces. In addition, under the physical effect of the non-smooth surfaces of the concave-convex microstructures 4 on the alignment film layers 5, liquid crystal molecules on the concave-convex microstructures can be in regular multi-domain structures, so that directors of the liquid crystal molecules are consistent as a whole, and thus the helical axes of all the liquid crystal molecules in the FC texture are parallel to the substrate surfaces (i.e., the horizontal direction in the figure) to the greatest extent. Therefore, due to the above structure, the possibility of scattering incident light from the liquid crystal layer can be greatly reduced, and thus the dark-state effect can be guaranteed.

In the LCD panel of the embodiment of the disclosure, the alignment film layers 5 are arranged on both the surface of the first substrate 1 and the surface of the second substrate 2, which surfaces face the liquid crystal layer 3, and the concave-convex microstructures 4 are formed on the alignment film layers 5. Therefore, the structural molecules alignment state of the P texture and the FC texture of the cholesteric liquid crystals can be optimized, and thus the display performance of the LCD panel can be improved.

In one example, the sizes of concave spaces of the concave-convex microstructures 4 adjacent to each other are not less than the volume of the liquid crystal droplets in the liquid crystal drop filling process. When the sizes of the concave spaces of the concave-convex microstructures 4 are not less than the volume of the liquid crystal droplets in the drop filling process, the liquid crystal droplets contained within the concave spaces can be partially separated from other liquid crystal droplets, and thus the phenomenon of mutual phagolysis which tends to occur among the liquid crystal droplets can be effectively prevented.

For example, the volumes of the liquid crystal droplets are between 0.003 and 0.005 mL in general, and the cell gap of the liquid crystal cell (namely the distance between the two substrates) is between 2.5 and 4.0 µm. In addition, the height of convex portions of the concave-convex microstructures 4 may be less than a half of the cell gap, for instance, ¼ to ⅓.

Moreover, the convex portions of the concave-convex microstructures 4 may take the shape of cones, triangular pyramids or cylinders formed on the substrate surfaces. The concave-convex microstructures may have the convex portions and concave portions disposed between the convex portions; the convex portions may be evenly or unevenly distributed on the whole surfaces, and the size, height and other parameter(s) of all the convex portions may be consistent or inconsistent with each other as long as the effect required by the disclosure can be achieved.

The concave-convex microstructures 4 may be formed by a way of a electropolymerization process, a laser-induced process, a template imprinting process or other process for preparing high molecular polymers (in the form of a film or layer) with specific morphology. The processes may be conventional processes and will not be described in detail herein.

Figure 4A:
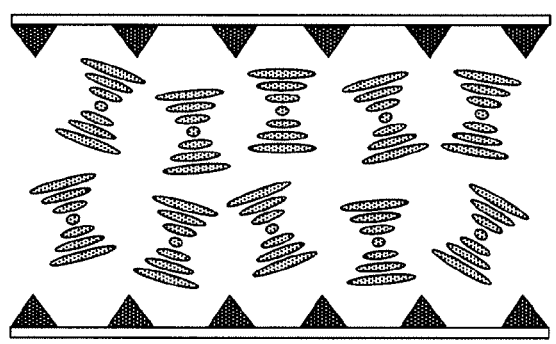
FIG. 4a is a schematic diagram illustrating the alignment state of the P texture of the cholesteric liquid crystal molecules when the concave-convex microstructures in the embodiment of the disclosure take the shape of cones.
Figure 4B:
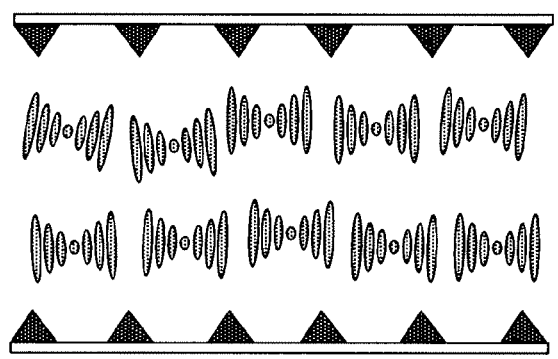
FIG. 4b is a schematic diagram illustrating the alignment state of the FC texture of the cholesteric liquid crystal molecules when the concave-convex microstructures in the embodiment of the disclosure take the shape of cones.

According to one example of the embodiment of the disclosure, when the concave-convex microstructures 4 of the alignment film layers take the shape of cones, the gap between two adjacent conical structures can be determined by the voltage applied during the electropolymerization and duration of the electropolymerization, or the intensity of the laser for inducing, or the shape of the used template. Due to the physical effect of the conical concave-convex structures, as illustrated in FIG. 4a, the helical axes of the P-texture cholesteric liquid crystal molecules can no longer be parallel to the normal direction of the substrates. At this point, due to the irregular arrangement manner of the helical axes of the liquid crystal molecules, the liquid crystal layer can no longer satisfy the Bragg reflection condition, and hence white light can not be reflected into colored light from the liquid crystal layer under the bright state again. On the other hand, as illustrated in FIG. 4b, the helical axes of the FC-texture cholesteric liquid crystal molecules can be parallel to the substrate surfaces to the greatest extent. Therefore, the possibility of scattering the incident light from the liquid crystal layer can be greatly reduced, and thus the dark-state effect can be guaranteed.

Figure 5A:
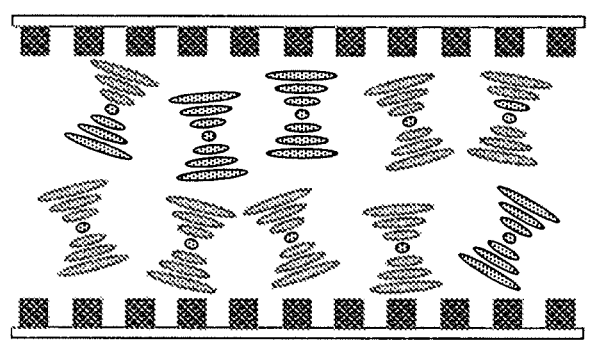
FIG. 5a is a schematic diagram illustrating the alignment state of the P texture of the cholesteric liquid crystal molecules when the concave-convex microstructures in the embodiment of the disclosure take the shape of cylinders.
Figure 5B:
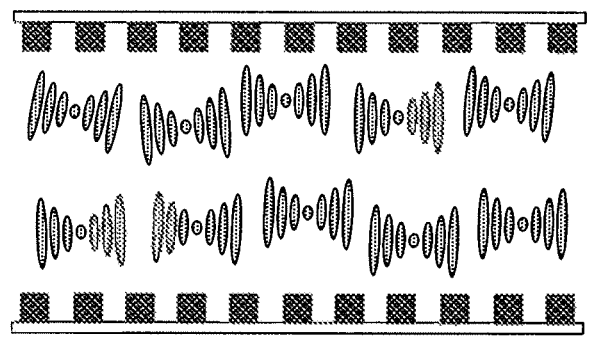
FIG. 5b is a schematic diagram illustrating the alignment state of the FC texture of the cholesteric liquid crystal molecules when the concave-convex microstructures in the embodiment of the disclosure take the shape of cylinders.

According to another example of the embodiment of the disclosure, when the concave-convex microstructures 4 of the alignment films take the shape of cylinders, the gap between two adjacent cylindrical structures can be determined by the voltage applied during the electropolymerization and duration of the electropolymerization, or the intensity of the laser for inducing, or the shape of the used template. Due to the physical effect of the cylindrical concave-convex surfaces, as illustrated in FIG. 5a, the helical axes of the P-texture cholesteric liquid crystal molecules can no longer be parallel to the normal direction of the substrates. At this point, due to the irregular arrangement manner of the helical axes of the liquid crystal molecules, the liquid crystal layer can no longer satisfy the Bragg reflection condition, and thus white light can not be reflected into colored light from the liquid crystal layer under the bright state again. On the other hand, as illustrated in FIG. 5b, the helical axes of the FC texture cholesteric liquid crystal molecules may be parallel to the substrate surfaces to the greatest extent. Therefore, the possibility of scattering the incident light from the liquid crystal layer can be greatly reduced, and thus the dark-state effect can be guaranteed.

Periodic reflection points are disposed on interfaces between layers of two different media, which layers are periodically and alternatively arranged; and when light is incident, periodic reflection may occur, which phenomenon is called as Bragg reflection. The interfaces may take different shapes, for example, sine wave or nonsine (such as square wave, triangular wave, etc.).

For example, the concave-convex microstructures 4 are formed on the surfaces of the alignment film layers 5 on the first and second substrates, which surface face the liquid crystal layer 3. The concave-convex microstructures 4 may be uniformly distributed on the alignment film layers 5. With the arrangement of the regular concave-convex microstructures 4 on the alignment film layers 5, the liquid crystal molecules in the liquid crystal layer 3 can be more regularly aligned, and hence the liquid crystal layer can have a regular multi-domain structure. Thus, the display performance of the LCD panel can be optimized and the display effect can be greatly improved.

Moreover, the liquid crystal layer may be formed of positive or negative cholesteric liquid crystals.

The alignment film layers 5 may be polyester film layers or polyimide film layers and formed on the surfaces of the first and second substrate, for example, by a coating method, and hence, the concave-convex microstructures 4 may be formed, for example, by a electropolymerization process, a laser-induced process or a template imprinting process.

Furthermore, the disclosure also provides an LCD device comprising the LCD panel. The LCD device can be any product or component having the display function, such as a mobile phone, a tablet PC, a television, a display, a notebook, a digital photo frame, a navigator and the like.

The LCD device may further comprise a backlight module for providing a light source for the LCD panel.

According to the LCD panel and the LCD device of the embodiment of the disclosure, by arrangement of the concave-convex microstructures, the structural alignment state of the cholesteric liquid crystals in the P texture and the FC texture can be optimized, and hence the display performance of the LCD panel and the LCD device can be improved. Moreover, due to the concave-convex microstructures, the phenomenon of mutual phagolysis which tends to occur among the liquid crystal molecules can be prevented. Furthermore, due to the regular concave-convex microstructures, the cholesteric liquid crystals can have a regular multi-domain structure, and hence the display effect can be greatly improved.

The foregoing is only illustrative of the preferred embodiments of the disclosure and is not intended to limit the scope of protection of the disclosure. The scope of protection of the disclosure is only limited by the appended claims.

What is claimed is:

1. A liquid crystal display (LCD) panel, comprising:
a first substrate,
a second substrate arranged opposing to the first substrate, and
a liquid crystal layer arranged between the first substrate and the second substrate,
wherein alignment film layers are provided on the surfaces of the first and second substrates facing the liquid crystal layer; the liquid crystal layer is formed of cholesteric liquid crystals; and concave-convex microstructures are formed on the surfaces of the alignment film layers, and heights of convex portions of the concave-convex microstructures are from ¼ to ½ of a cell gap of the LCD panel;
the concave-convex microstructures comprise a plurality of island-like convex portions, the convex portions are aligned along a horizontal direction and a longitudinal direction in an array, and the island-like convex portions take shape of cones or triangular pyramids; sharp angles of the island-like convex portions face towards the liquid crystal layer; sizes of concave spaces of the concave-convex microstructures adjacent to each other are not less than 0.003 mL.

2. The LCD panel according to claim 1, wherein the concave-convex microstructures are uniformly distributed on the alignment film layers.

3. The LCD panel according to claim 1, wherein the liquid crystal layer is formed of positive or negative cholesteric liquid crystals.

4. The LCD panel according to claim 1, wherein each of the alignment film layers is a polyester film layer or a polyimide film layer.

5. The LCD panel according to claim 1, wherein the concave-convex microstructures are formed by an electropolymerization process, a laser-induced process or a template imprinting process.

6. A liquid crystal display (LCD) device, comprising the LCD panel according to claim 1.

7. A liquid crystal display (LCD) panel, comprising:
a first substrate,
a second substrate arranged opposing to the first substrate, and a liquid crystal layer arranged between the first substrate and the second substrate, wherein alignment film layers are provided on the surfaces of the first and second substrates facing the liquid crystal layer; the liquid crystal layer is formed of cholesteric liquid crystals; and concave-convex microstructures are formed on the surfaces of the alignment film layers, and heights of convex portions of the concave-convex microstructures are from ¼ to ½ of a cell gap of the LCD panel; and upon cholesteric liquid crystal molecules of the liquid crystal layer being in P texture, liquid crystal helical axes generally are arranged irregularly and the liquid crystal layer can no longer satisfy the Bragg reflection condition;

convex portions of the concave-convex microstructures take shape of cones or triangular pyramids, and sharp angles of the island-like convex portions face towards the liquid crystal layer; sizes of concave spaces of the concave-convex microstructures adjacent to each other are not less than 0.003 mL.

8. The LCD panel according to claim 7, wherein the concave-convex microstructures are uniformly distributed on the alignment film layers.

9. The LCD panel according to claim 7, wherein the liquid crystal layer is formed of positive or negative cholesteric liquid crystals.

10. The LCD panel according to claim 7, wherein each of the alignment film layers is a polyester film layer or a polyimide film layer.

11. The LCD panel according to claim 7, wherein the concave-convex microstructures are formed by an electropolymerization process, a laser-induced process or a template imprinting process.

\* \* \* \* \*